United States Patent
Yamamoto et al.

(10) Patent No.: US 10,644,619 B2
(45) Date of Patent: May 5, 2020

(54) MOTOR CONTROL DEVICE

(71) Applicant: Panasonic Intellectual Property Management Co., Ltd., Osaka (JP)

(72) Inventors: Ryosuke Yamamoto, Osaka (JP); Hiroyuki Nakata, Osaka (JP); Atsumi Hashimoto, Osaka (JP); Yasuyoshi Honuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/071,113

(22) PCT Filed: Mar. 27, 2017

(86) PCT No.: PCT/JP2017/012233
§ 371 (c)(1),
(2) Date: Jul. 19, 2018

(87) PCT Pub. No.: WO2017/170317
PCT Pub. Date: Oct. 5, 2017

(65) Prior Publication Data
US 2019/0260313 A1    Aug. 22, 2019

(30) Foreign Application Priority Data
Mar. 29, 2016    (JP) .................. 2016-065317

(51) Int. Cl.
*H02P 1/02*    (2006.01)
*H02P 23/16*    (2016.01)
(Continued)

(52) U.S. Cl.
CPC ............ *H02P 1/029* (2013.01); *B25J 9/1638* (2013.01); *B25J 9/1674* (2013.01); *B25J 9/1676* (2013.01);
(Continued)

(58) Field of Classification Search
CPC .......... H02K 9/19; H02K 16/00; H02K 16/02; H02K 2201/18; G03F 7/70758
See application file for complete search history.

(56) References Cited

U.S. PATENT DOCUMENTS 5,994,864 A * 11/1999 Inoue .................... B25J 9/1633
                                                                318/568.2
2010/0039059 A1    2/2010 Ando et al.
(Continued)

FOREIGN PATENT DOCUMENTS

EP            881044 A1     12/1998
JP           63-008912       1/1988
(Continued)

OTHER PUBLICATIONS

International Search Report of PCT application No. PCT/JP2017/012233 dated Jun. 13, 2017.
The Extended European Search Report dated Feb. 12, 2019 for the related European Patent Application No. 17774854.8.

*Primary Examiner* — Kawing Chan
*Assistant Examiner* — Zoheb S Imtiaz
(74) *Attorney, Agent, or Firm* — Wenderoth, Lind & Ponack, L.L.P.

(57) ABSTRACT

A disclosed motor control device includes: a PI controller which controls a velocity of a motor; an input unit which receives specification information including information of a weight and a center of mass of a tool; a calculation unit which calculates a gravitational torque based on the specification information; a storage which stores the gravitational torque output from the calculation unit and an integral value output from the PI controller, and outputs the gravitational torque and the integral value in response to a break signal; and a selection unit which sets, to the PI controller, the integral value output from the storage, according to a collision sensitivity input from the input unit.

4 Claims, 7 Drawing Sheets

(51) Int. Cl.
  *B25J 9/16* (2006.01)
  *H02P 23/00* (2016.01)
  *H02P 23/14* (2006.01)
  *H02P 29/40* (2016.01)
  *H02P 29/04* (2006.01)
  *G05B 19/4067* (2006.01)
  *G05B 19/4093* (2006.01)

(52) U.S. Cl.
  CPC .......... *H02P 23/0004* (2013.01); *H02P 23/14* (2013.01); *H02P 23/16* (2016.02); *H02P 29/04* (2013.01); *H02P 29/40* (2016.02); *G05B 19/4067* (2013.01); *G05B 19/40938* (2013.01); *G05B 2219/50391* (2013.01); *H02P 2205/07* (2013.01)

(56) References Cited

U.S. PATENT DOCUMENTS

2013/0006422 A1  1/2013  Komatsu
2015/0045952 A1* 2/2015  Kosaka ................. B25J 9/1633
                                              700/258

FOREIGN PATENT DOCUMENTS

| JP | 2005-254410 A | 9/2005 |
| JP | 2010-045912 | 2/2010 |
| JP | 2013-226619 | 11/2013 |
| WO | 2012/077335 | 6/2012 |

* cited by examiner

FIG. 4

| Collision detection torque TC (Maximum torque ratio [%]) \ Collision sensitiviity X[%] | 20% | 50% | 80% | 100% |
|---|---|---|---|---|
| 20[%] | × | × | × | ○ |
| 30[%] | × | × | × | ○ |
| 40[%] | × | × | ○ | ○ |
| 50[%] | × | ○ | ○ | ○ |

○ : Collision detected
× : No collision detected

MOTOR CONTROL DEVICE

This application is a U.S. national stage application of the PCT International Application No. PCT/JP2017/012233 filed on Mar. 27, 2017, which claims the benefit of foreign priority of Japanese patent application 2016-065317 filed on Mar. 29, 2016, the contents all of which are incorporated herein by reference.

TECHNICAL FIELD

The present disclosure relates to a motor control device, and, in particular, to the correction of the gravitational torque of the motor at the time of re-operation after stopping.

BACKGROUND ART

Conventionally, a motor control device has been developed which stabilizes the behavior of the gravity shaft in a robot such as a manipulator to prevent the gravity shaft from falling when power is supplied to the servomotor which drives the gravity shaft.

Conventional motor control device 900 will be described with reference to FIG. 6 and FIG. 7. FIG. 6 illustrates conventional motor control device 900. FIG. 7 illustrates the details of proportional-integral (PD controller 901 of conventional motor control device 900.

As illustrated in FIG. 6, conventional motor control device 900 includes PI controller 901, current controller 902, inverter circuit 903, motor 904, encoder 905, converter 906, storage 907, and breaking device 908. Encoder 905 detects the position of the rotor of motor 904 at a predetermined sampling period, and transmits the detected positional information to converter 906. Converter 906 calculates the rotational velocity of the rotor of motor 904 from the change in position of the rotor based on the positional information transmitted from encoder 905. Converter 906 then transmits, to PI controller 901, the calculated rotational velocity of the rotor as feedback velocity $V_{FB}$.

Storage 907 receives break signal $B_{SIG}$ to be input to breaking device 908, and torque command value $T_{COM}$ output from PI controller 901, and stores torque command value $T_{COM}$. Moreover, when break signal $B_{SIG}$ is changed from ON to OFF, storage 907 outputs torque command value $T_{COM}$ at that time to PI controller 901.

PI controller 901 receives velocity command VCOM and feedback velocity $V_{FB}$. PI controller 901 performs calculation to output torque command value $T_{COM}$ to current controller 902. Moreover, PI controller 901 receives, from storage 907, torque command value $T_{COM}$ obtained when brake signal $B_{SIG}$ is changed from ON to OFF.

Current controller 902 receives torque command value $T_{COM}$ and feedback current $I_{FB}$ of the current to be supplied to motor 904, calculates an inverter drive command, and outputs the calculated inverter drive command to inverter circuit 903. Inverter circuit 903 supplies current to motor 904 based on the received inverter drive command to control the driving of motor 904.

Next, with reference to FIG. 7, PI controller 901 will be specifically described. PI controller 901 includes proportional component calculation unit 911 and integral component calculation unit 912. Proportional component calculation unit 911 and integral component calculation unit 912 each receive error velocity dV which is the difference between velocity command $V_{COM}$ and feedback velocity $V_{FB}$. The value calculated by proportional component calculation unit 911 from error velocity dV and the value calculated by integral component calculation unit 912 from error velocity dV are added, and torque command value $T_{COM}$ is output. The output torque command value $T_{COM}$ is stored in storage 907. Subsequently, as described above, torque command value $T_{COM}$ obtained when brake signal $B_{SIG}$ is changed from ON to OFF is output from storage 907 to integral component calculation unit 912 of PI controller 901.

Accordingly, PI controller 901 uses torque command value $T_{COM}$ obtained when brake signal $B_{SIG}$ is changed from ON to OFF as a holding torque, so that the falling of the gravity shaft can be prevented when brake signal $B_{SIG}$ is changed again from OFF to ON (when power starts to be supplied to motor 904) (for example, see Patent Literature (PTL) 1).

CITATION LIST

Patent Literature

PTL 1: Japanese Unexamined Patent Application Publication No. 2010-45912

SUMMARY OF THE INVENTION

A motor control device according to the present disclosure includes: a PI controller which controls the velocity of a motor; an input unit which receives specification information including information of the weight and the center of mass of a tool; a calculation unit which calculates a gravitational torque based on the specification information; a storage which stores an integral value output from the PI controller and outputs the gravitational torque and the integral value in response to a break signal, and a selection unit which sets, to the PI controller, the integral value output from the storage, according to a collision sensitivity input from the input unit.

BRIEF DESCRIPTION OF DRAWINGS

FIG. 4 illustrates a relationship between collision sensitivity and collision detection torque in a robot.

DESCRIPTION OF EMBODIMENT

Prior to the description of an embodiment of the present disclosure, a problem in the conventional motor control device will be briefly described.

Figure 6:
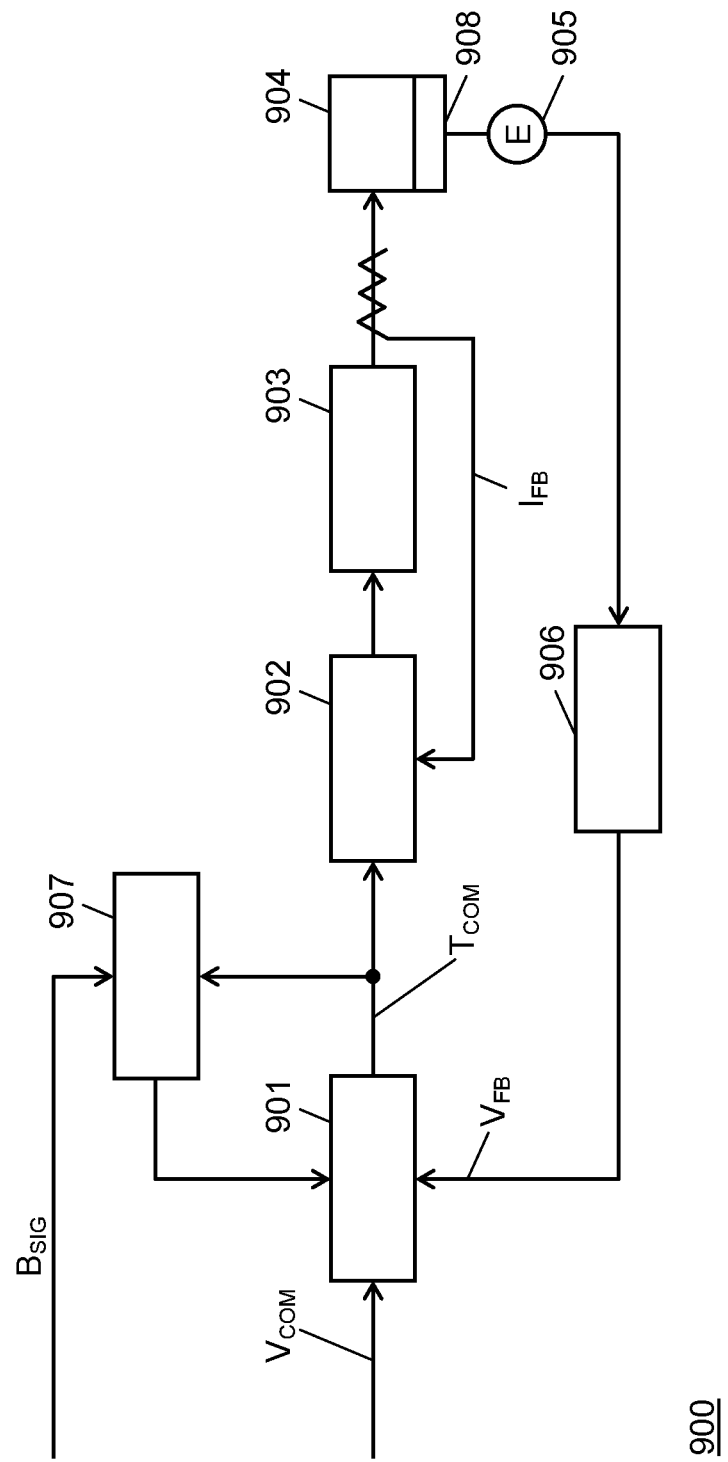
FIG. 6 illustrates conventional motor control device 900.
Figure 7:
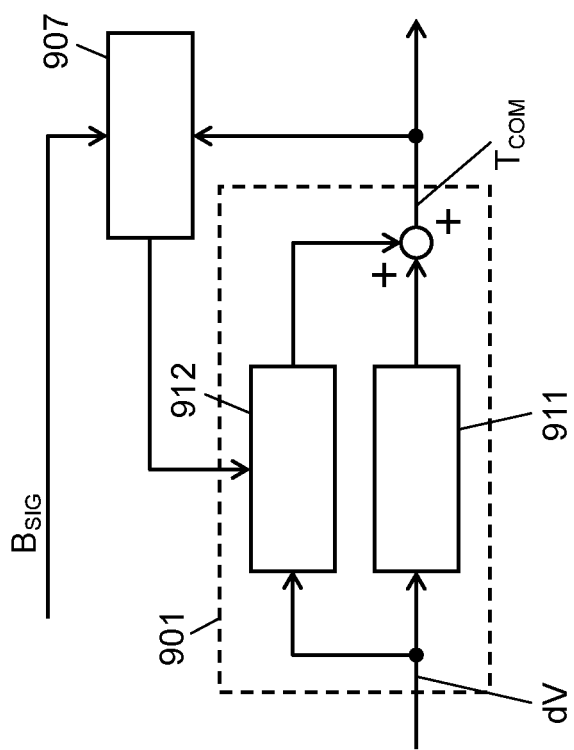
FIG. 7 illustrates the details of PI controller 901 of conventional motor control device 900.

Conventional motor control device 900 which has been described with reference to FIG. 6 and FIG. 7 has the following problem. In the conventional motor control device, when brake signal $B_{SIG}$ is changed from ON to OFF in a state where motor 904 is stationary torque command value $T_{COM}$ stored in storage 907 is the holding torque of motor 904. However, when motor 904 has stopped suddenly or when motor 904 has been stopped by a collision, torque command value $T_{COM}$ obtained when brake signal $B_{SIG}$ stored in storage 907 is changed from ON to OFF is not an appropriate holding torque of motor 904 at such a time. Therefore, when motor 904 has stopped suddenly or when motor 904 has been stopped by a collision in conventional motor control device 900, the gravity shaft bounces or falls when power starts to be supplied to motor 904, which poses a risk that the arm collides with peripheral devices or workers.

Hereinafter, an embodiment of the present disclosure will be described with reference to FIG. 1 to FIG. 5.

Figure 1:
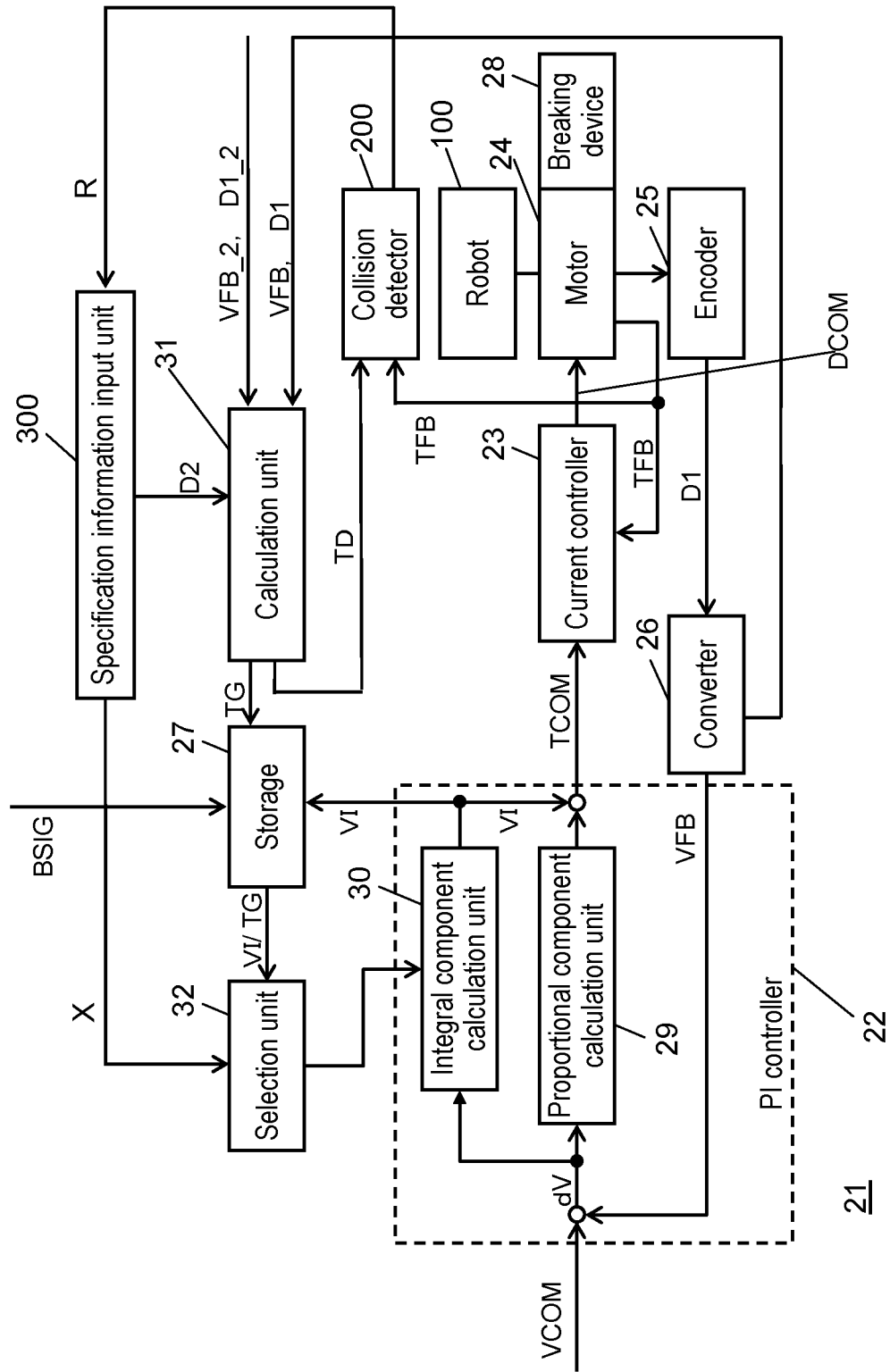
FIG. 1 illustrates a motor control device according to an embodiment.

FIG. 1 illustrates motor control device 21 according to the present disclosure. The case where motor 24 has been attached to robot 100 will be described.

Encoder 25 detects the position of the rotor of motor 24 at a predetermined sampling period, and transmits detected positional information D1 of motor 24 to converter 26. Converter 26 calculates the rotational velocity of the rotor of motor 24 from the temporal change in positional information D1 transmitted from encoder 25. The rotational velocity calculated by converter 26 is transmitted as feedback velocity $V_{FB}$ to PI controller 22. Moreover, converter 26 transmits feedback velocity $V_{FB}$ and positional information D1 to calculation unit 31.

Calculation unit 31 receives: specification information D2 including information of the weight and the center of mass of a tool; positional information D1 of motor 24; and feedback velocity VFB. Moreover, when robot 100 includes another motor (not illustrated) in addition to motor 24, feedback velocity VFB_2 based on the positional information of the other motor and positional information D1_2 of the other motor are also input to calculation unit 31 from another control block. Calculation unit 31 calculates gravitational torque TG which acts on motor 24, and transmits gravitational torque TG to storage 27.

PI controller 22 includes proportional component calculation unit 29 and integral component calculation unit 30. Proportional component calculation unit 29 and integral component calculation unit 30 each receive error velocity dV which is the difference between velocity command VCOM and feedback velocity VFB. Integral value VI calculated by integral component calculation unit 30 is added to the value calculated by proportional component calculation unit 29 based on error velocity dV, so that torque command value TCOM is output from PI controller 22 to current controller 23. Storage 27 receives break signal BSIG to be input to breaking device 28, integral value VI output from integral component calculation unit 30, and gravitational torque TG output from calculation unit 31. Storage 27 then stores integrated value VI output from integral component calculation unit 30 and gravitational torque TG. Storage 27 then transmits, to selection unit 32, integral value VI and gravitational torque TG obtained when brake signal BSIG is changed from ON to OFF.

Selection unit 32 receives integral value VI of torque command value TCOM and gravitational torque TG output from storage 27, and transmits the value set by selection unit 32 to integral component calculation unit 30 of PI controller 22.

Moreover, the value set when brake signal BSIG is changed from ON to OFF is transmitted from selection unit 32 to integral component calculation unit 30 of PI controller 22.

Current controller 23 receives torque command value TCOM from PI controller 22. Moreover, current controller 23 receives motor-generated torque TFB. Current controller 23 calculates drive command value DCOM, and supplies current to motor 24 based on drive command value DCOM. In such a manner, current controller 23 controls the driving of motor 24.

[Operation of Collision Detector 200]

Figure 3:
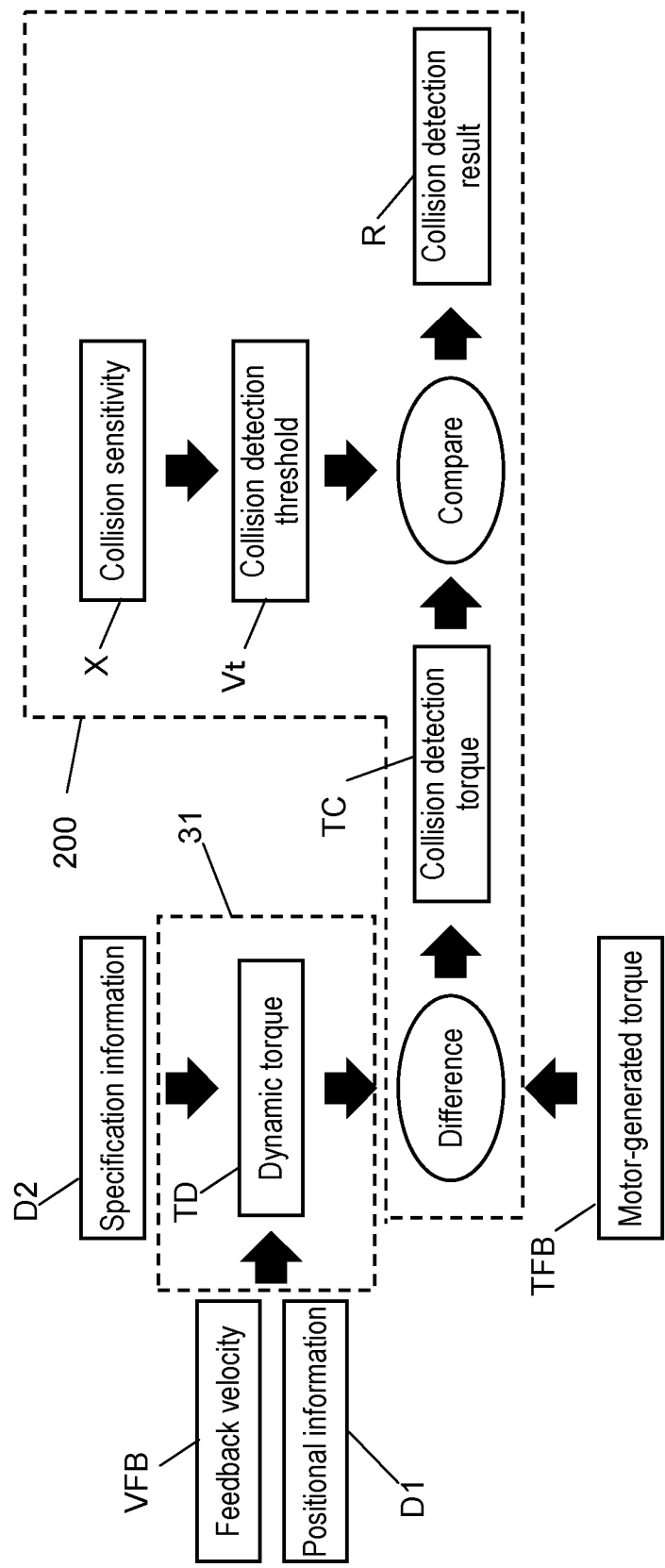
FIG. 3 illustrates a method for detecting a collision detection result performed by collision detector 200.

Next, collision sensitivity will be described with reference to FIG. 1 and FIG. 3. As illustrated in FIG. 3, in the collision detection function, calculation unit 31 calculates, in advance, the torque which originally acts on motor 24 as dynamic torque TD from positional information D1 of motor 24 that can be obtained from encoder 25, information of the velocity and acceleration (here, feedback velocity VFB), and specification information D2 such as the mass of the tool and the robot body. Collision detector 200 then compares, with collision detection threshold Vt, collision detection torque TC which is the difference between motor-generated torque TFB which has actually acted on motor 24 under the control of current controller 23 and dynamic torque TD. Note that collision detection threshold Vt is determined according to collision sensitivity X set in advance. When collision detection torque TC is greater than or equal to collision detection threshold Vt, collision detection result R indicates that a collision has occurred. Moreover, collision sensitivity X can be set by a user. The range of the threshold is set according to the sensitivity, so that a collision is correctly detected while preventing a false detection of a collision.

Next, a specific example of an operation of collision detector 200 will be described with reference to FIG. 4. In the example illustrated in FIG. 4, when collision detection torque TC (maximum torque ratio) is 20%, if collision sensitivity X is set to 20%, 50%, or 80%, a "collision" is not detected. In contrast, when collision sensitivity X is set to 100%, a "collision" is detected. In other words, collision detection threshold Vt is set to a value in a range from greater than or equal to 80% to less than 100% of collision sensitivity X.

When collision detection torque TC (maximum torque ratio) is 30%, an operation is performed in a similar manner to the operation performed when collision detection torque TC is 20%.

When collision detection torque TC (maximum torque ratio) is 40%, collision detection threshold Vt is set to a value in a range from greater than or equal to 50% to less than 80% of collision sensitivity X. Hence, for example, when collision sensitivity X is set to 50%, a "collision" is not detected, but when collision sensitivity X is set to 80%, a "collision" is detected.

When collision detection torque TC (maximum torque ratio) is 50%, collision detection threshold Vt is set to a value in a range from greater than or equal to 20% to less than 50% of collision sensitivity X. Hence, for example, when collision sensitivity X is set to 20%, a "collision" is not detected, but when collision sensitivity X is set to greater than or equal to 50%, a "collision" is detected.

FIG. 4 illustrates an example of a relationship between collision sensitivity X and collision detection torque TC. Note that when collision detection threshold Vt is set differently, the relationship between collision detection torque TC and collision sensitivity X is different from FIG. 4. When the collision sensitivity is set to be higher, the frequency of the detection of a collision increases, and when the collision sensitivity is set to be lower, the frequency of the detection of a collision decreases.

For example, when the collision sensitivity is set to be higher, even if a small impact is made, a "collision" is detected. In contrast, when the collision sensitivity is set to be lower, a small impact is not considered as a "collision".

Moreover, when a collision torque is detected when power starts to be supplied to motor 24, the magnitude of collision detection threshold Vt is determined according to collision sensitivity X which has been set. Accordingly, it can be said that collision sensitivity X which has been set indicates the accuracy of load information. Note that collision sensitivity X can be arbitrarily set to specification information input unit 300 by a user in advance.

[Description of Operation of Selection Unit 32]

Figure 2:
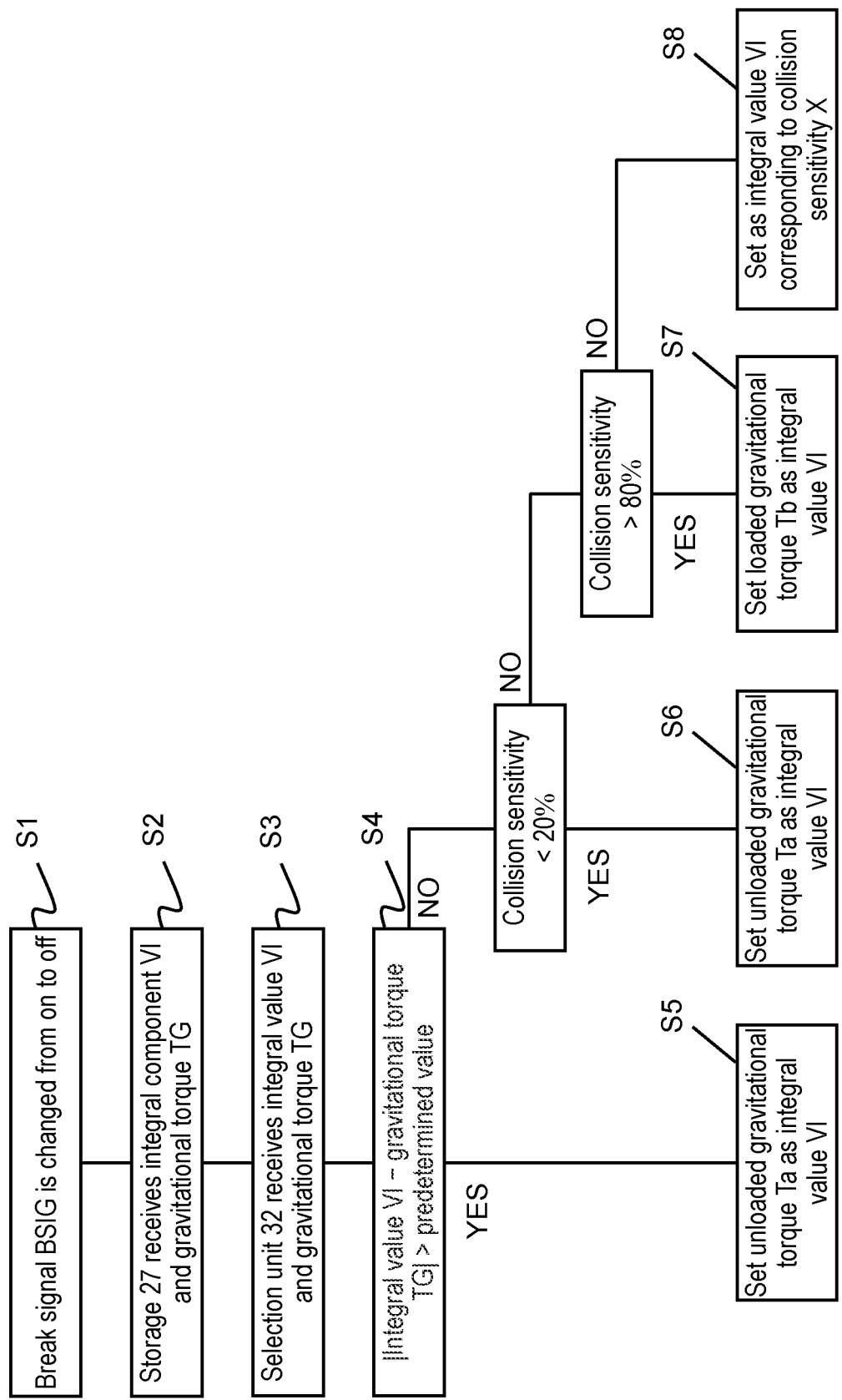
FIG. 2 is a flowchart of an operation of selection unit 32 of the motor control device according to the embodiment.

Next, an operation of selection unit 32 will be specifically descried with reference to FIG. 1 and FIG. 2. In selection unit 32, when break signal BSIG is changed from ON to OFF (S1), storage 27 receives integral value VI from integral component calculation unit 30 and gravitational torque TG from calculation unit 31 (S2). Next, integral value VI and gravitational torque TG are input to selection unit 32 from storage 27 (S3). Selection unit 32 compares integration value VI and gravitational torque TG which have been input (S4). When the difference between integral value VI and gravitational torque TG is greater than a predetermined value (YES in S4), it is considered that motor 904 has stopped suddenly or motor 904 has been stopped by a collision. Here, an unloaded gravitational torque Ta is output to integral component calculation unit 30 of PI controller 22 (S5).

Next, when the difference between integral value VI and gravitational torque TG is equal to or less than the predetermined value (NO in S4), selection unit 32 outputs, to integral component calculation unit 30, the gravitational torque corresponding to collision sensitivity X output from specification information input unit 300 (S6 to S8).

Figure 5:
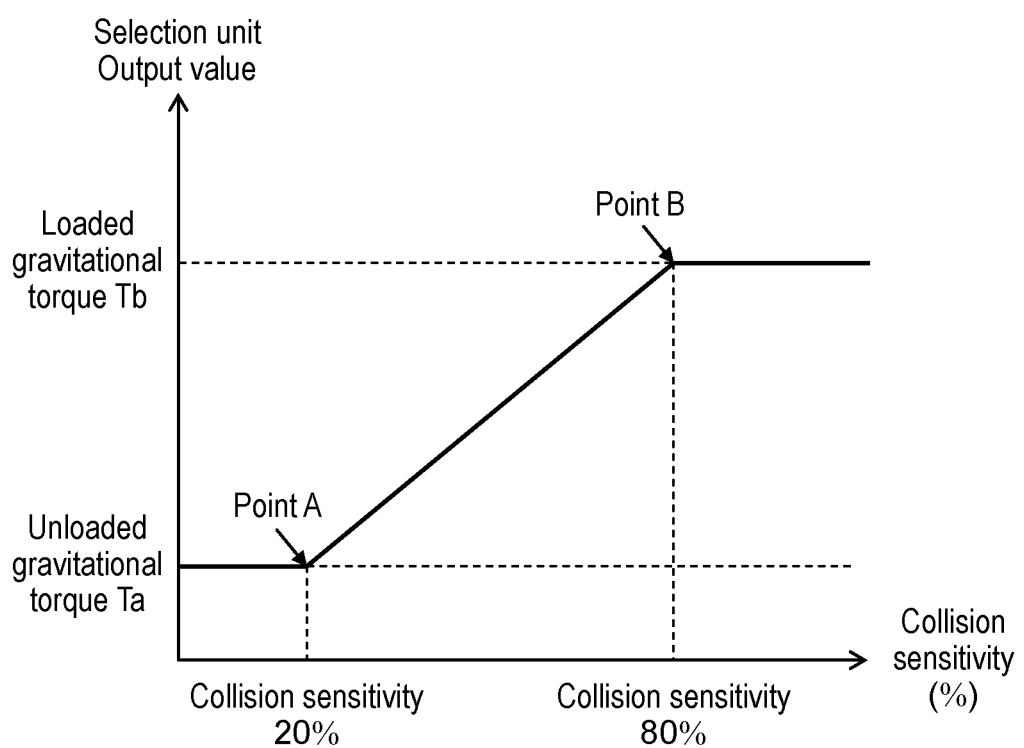
FIG. 5 illustrates a relationship between collision sensitivity and set holding torque in a robot.

Next, S6 to S8 will be described with reference to FIG. 2 and FIG. 5. When collision sensitivity X is less than 20%, selection unit 32 outputs unloaded gravitational torque Ta to integral component calculation unit 30 of PI controller 22 (S6). When collision sensitivity X is greater than 80%, selection unit 32 outputs loaded gravitational torque Tb to integral component calculation unit 30 of PI controller 22 (S7). When collision sensitivity X is greater than or equal to 20% and less than or equal to 80%, as illustrated in FIG. 5, loaded gravitational torque Tb is output when collision sensitivity X is 80% and unloaded gravitational torque Ta is output when collision sensitivity X is 20%. When collision sensitivity X is greater than or equal to 20% and less than or equal to 80%, selection unit 32 outputs, to integral component calculation unit 30 of PI controller 22, the gravitational torque corresponding to the set sensitivity along the straight line passing through points A and B (S8).

Note that the user arbitrarily sets collision sensitivity X in advance to specification information input unit 300. Moreover, the user sets load information as specification information D2 in advance to specification information input unit 300. Subsequently, as described above, the user can reset specification information D2 according to collision detection result R of collision detector 200.

As described above, PI controller 22 uses, as a holding torque, the value input by selection unit 32 to integral component calculation unit 30 according to collision sensitivity X. Therefore, even when motor 24 has stopped suddenly or has been stopped by a collision, it is possible to prevent the gravity shaft from bouncing or falling when break signal BSIC is changed from OFF to ON again (when power starts to be supplied to the motor).

SUMMARY

Motor control device 21 according to the present disclosure includes PI controller 22, specification information input unit 300, calculation unit 31, storage 27, and selection unit 32.

PI controller 22 controls the velocity of the motor. Specification information input unit 300 receives specification information D2 including information of the weight and the center of mass of the tool. Calculation unit 31 calculates gravitational torque TG based on specification information D2. Storage 27 stores gravitational torque TG output from calculation unit 31 and integral value VI output from PI controller 22. Storage 27 further outputs gravitational torque TG and integral value VI in response to break signal BSIG. Selection unit 32 sets, to PI controller 22, integral value VI input from storage unit 27, according to collision sensitivity X input from specification information input unit 300.

Moreover, in motor control device 21 according to the present disclosure, specification information D2 includes load information, and when it is determined based on the load information of specification information D2 that no tool has been attached, selection unit 32 sets, to PI controller 22, unloaded gravitational torque as integral value VI. When it is determined based on the load information of specification information D2 that a tool has been attached, selection unit 32 sets, to PI controller 22, loaded gravitational torque as integral value VI.

Note that specification information D2 can be arbitrarily set by a user.

INDUSTRIAL APPLICABILITY

Motor control device 21 according to the present disclosure can prevent the gravity shaft from bouncing or falling when power starts to be supplied to the motor, even when the motor has stopped suddenly or the motor has been stopped by a collision. Hence, motor control device 21 according to the present disclosure is industrially useful.

REFERENCE MARKS IN THE DRAWINGS 21 motor control device
22 PI controller
23 current controller
24 motor
25 encoder
26 converter
27 storage
28 breaking device
29 proportional component calculation unit
30 integral component calculation unit
31 calculation unit
32 selection unit
100 robot
200 collision detector
300 specification information input unit
900 motor control device
901 PI controller
902 current controller
903 inverter circuit
904 motor
905 encoder
906 converter
907 storage
908 breaking device
911 proportional component calculation unit
912 integral component calculation unit
dV error velocity
BSIG break signal
D1 positional information
D2 specification information
DCOM drive command value Ta unloaded gravitational torque
Tb loaded gravitational torque
TG collision detection torque
TD dynamic torque
TG gravitational torque
TFB motor-generated torque
TCOM torque command value
R collision detection result
VCOM velocity command
VFB feedback velocity
$I_{FB}$ feedback current
X collision sensitivity
Vt collision detection threshold
VI integral value

The invention claimed is:

1. A motor control device comprising:
a proportional-integral (PI) controller configured to control a velocity of a motor;
an input unit configured to receive specification information including information of a weight and a center of mass of a tool;
a calculation unit configured to calculate a gravitational torque based on the specification information;
a storage configured to store an integral value output from the PI controller, the storage being further configured to store the gravitational torque output from the calculation unit and to output the gravitational torque and the integral value in response to a break signal allowing to switch off the power supplied to the motor; and
the motor control device further comprising
a selection unit configured to trigger, through the break signal, the setting of the integral value depending on a collision sensitivity provided through the input unit, and to provide the PI controller with the integral value,
wherein the collision sensitivity is configured to be set by a user and a collision detection threshold is determined according to the collision sensitivity.

2. The motor control device according to claim 1,
wherein the specification information includes load information that allows a determination of whether or not the tool is attached, and
the selection unit being further configured to set the integral value as being:
an unloaded gravitation torque, when the load information allows a first determination that the tool is not attached, or
a loaded gravitational torque, when the load information allows a second determination that the tool is attached.

3. The motor control device according to claim 1,
wherein the specification information includes arbitrary specifications.

4. The motor control device according to claim 2, wherein the specification information is arbitrarily set.

* * * * *